United States Patent
Huang et al.

(10) Patent No.: US 8,750,275 B2
(45) Date of Patent: Jun. 10, 2014

(54) ANTENNA ARRAY CONTROL METHOD AND ACCESS POINT USING THE SAME

(75) Inventors: An Huang, Nanchong (CN); Kai-Ge Liu, Luoyang (CN); Xiang-Ming Ye, Beijing (CN)

(73) Assignees: Lite-On Electronics (Guangzhou) Limited, Guangzhou (CN); Lite-On Technology Corporation, Taipei (TW)

(*) Notice: Subject to any disclaimer, the term of this patent is extended or adjusted under 35 U.S.C. 154(b) by 143 days.

(21) Appl. No.: 13/531,497

(22) Filed: Jun. 23, 2012

(65) Prior Publication Data

US 2013/0177055 A1    Jul. 11, 2013

(30) Foreign Application Priority Data

Jan. 9, 2012    (CN) .......................... 2012 1 0003581

(51) Int. Cl.
*H04W 4/00*    (2009.01)
*H04B 3/46*    (2006.01)

(52) U.S. Cl.
USPC ........................................ 370/338; 375/224

(58) Field of Classification Search
CPC ............................... H04W 80/04; H04W 84/18
USPC .......... 370/252, 244, 232, 338; 375/224–228, 375/354; 324/71.1, 304, 337, 754.23
See application file for complete search history.

(56) References Cited

U.S. PATENT DOCUMENTS

| 7,266,685 | B1 * | 9/2007 | Meandzija et al. | 713/156 |
|---|---|---|---|---|
| 7,813,295 | B2 * | 10/2010 | Trachewsky | 370/252 |
| 8,213,868 | B2 * | 7/2012 | Du et al. | 455/63.1 |
| 8,310,947 | B2 * | 11/2012 | Hwang | 370/252 |
| 2006/0171357 | A1 * | 8/2006 | King et al. | 370/331 |
| 2007/0002892 | A1 * | 1/2007 | Waxman | 370/465 |
| 2009/0190488 | A1 * | 7/2009 | Hochwald et al. | 370/252 |
| 2010/0130150 | A1 * | 5/2010 | D'Amico et al. | 455/226.1 |
| 2011/0026418 | A1 * | 2/2011 | Bollea et al. | 370/252 |
| 2012/0094594 | A1 * | 4/2012 | Rofougaran et al. | 455/15 |
| 2012/0281563 | A1 * | 11/2012 | Comsa et al. | 370/252 |

* cited by examiner

*Primary Examiner* — Asad Nawaz
*Assistant Examiner* — Berhanu Belete
(74) *Attorney, Agent, or Firm* — Li & Cai Intellectual Property (USA) Office (57) ABSTRACT

An antenna array control method is illustrated. At least a packet is selected as at least a probing packet every probing period. One radiation pattern in a probing radiation pattern set is used to transmit the probing packet. The radiation pattern with the minimum packet error rate among all radiation patterns is selected as a best radiation pattern. When the probing period expires, a candidate radiation pattern set is obtained according to current probabilities of the radiation patterns to be the best radiation pattern. Transfer probabilities of the radiation patterns in the candidate radiation pattern set are obtained. A target radiation pattern set is obtained according to the transfer probabilities, a motion variation and trend set, and the candidate radiation pattern set. The probing period and the probing radiation pattern set are adjusted according to whether the target radiation pattern set equals to the probing radiation pattern set.

14 Claims, 7 Drawing Sheets

ANTENNA ARRAY CONTROL METHOD AND ACCESS POINT USING THE SAME

BACKGROUND

1. Technical Field

The present disclosure relates to an antenna array control method, in particular, to a real-time antenna array control method for selecting a best radiation pattern to perform a communication with a moving client, and the access point using the same.

2. Description of Related Art

Recently, the wireless communication technology develops rapidly, and thus the client can communicate with the access point served as the wireless hotspot, such as Wireless Fidelity (Wi-Fi) hotspot, to share data and browse the web page. The client is for example a smart phone, a pad, a notebook, or the other mobile device having the communication ability. The access point is for example a smart phone served as the mobile station, an indoor access point, an outdoor access point, or the other communication device allowing the client to establish a link to access the internet.

The radiation strength of the omni-directional antenna is distributed uniformly for all directions (or angles), and thus each of the most conventional access points adopts the omni-directional antenna to communicate with the clients of the different directions. Unfortunately, the omni-directional antenna has the dispersed antenna radiation energy, the low radiation efficiency, and the limited coverage.

For each of specific directions, the directional antenna has stronger radiation strength and the farther coverage. Thus, in order to increase the efficiency of antenna radiation energy and the coverage, some conventional access points adopt the directional antennas to communicate with the clients of the different directions. However, the conventional access point of this type, must know the specific position of the client during wireless communication, and the antenna array must be manually configured, such that the conventional access point can use the matched radiation pattern to communicate with the client.

In short, most conventional access points themselves are multiple input multiple output (MIMO) systems, and can select a best radiation pattern by using a conventional antenna array control method to communicate with the client of the specific direction. In other words, the beam forming is performed by the conventional access points. It is a pity that the conventional antenna array control method has the longer executing time and lower accuracy. In the worst case, if the client moves, the antenna array control method cannot track the client to select a best radiation pattern to perform a communication in real time.

SUMMARY

An antenna array control method and an access point using the same are provided by exemplary embodiments of the present disclosure, and the steps of the antenna array control method are described as follows. At least a packet is selected as at least a probing packet every probing period. One radiation pattern in a probing radiation pattern set is used to transmit the probing packet. The radiation pattern with the minimum packet error rate among all radiation patterns is selected as a best radiation pattern. When the probing period expires, a candidate radiation pattern set is obtained according to current probabilities of the radiation patterns to be the best radiation pattern. Transfer probabilities of the radiation patterns in the candidate radiation pattern set are obtained. A target radiation pattern set is obtained according to the transfer probabilities, the motion variation and trend set, and the candidate radiation pattern set. The probing period and the probing radiation pattern set are adjusted according to whether the target radiation pattern set equals to the probing radiation pattern set.

To sum up, the antenna array control method and access point according to exemplary embodiments of the present disclosure can fast and accurately find the best radiation pattern which is used to communicate with the client.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or similar parts.

An exemplary embodiment of the present disclosure provides an access point of executing an antenna array control method. The antenna array control method performs a real-time statistic operation on the motion variation and trend of the current client and the current probabilities of the radiation patterns to be the best radiation pattern, and obtains a better radiation pattern set according to a motion variation and trend set of a current client, the current probabilities, and the transfer probabilities and the prior probabilities of the radiation patterns to be the best radiation pattern, wherein the better radiation pattern set comprises better radiation patterns with the several bigger probabilities to be the best radiation pattern. The antenna array control method further updates the probing radiation pattern set, to make the radiation pattern be close or equal to the better radiation pattern set. Next, the antenna array control method probes the probing radiation pattern set to find the best radiation pattern quickly. Thus, for the clients with the different motion variations, the access point using the antenna array control method can merely probe the radiation patterns in the probing radiation pattern set to track the moving clients in real-time and use the best radiation pattern to communicate with the client.

In short, the antenna array control method efficiently uses the current statistic information and the prior statistic information to find the better radiation pattern set comprising better radiation patterns with the several bigger probabilities to be the best radiation pattern through the probability calculation. The current statistic information comprises the current probabilities of the radiation patterns and the motion variation and trend set of the current client, and the prior statistic information comprises the prior probabilities and the transfer probabilities of the radiation patterns. Thus, the accuracy and execution time of the antenna array control method for finding the best radiation pattern are respectively increased and shortened. In addition, the throughput and the coverage of the access point using the above antenna array control method can be further enhanced. The following descriptions illustrate the details of the exemplary embodiments of the access point and the antenna array control method.

[Exemplary Embodiment of Access Point]

Figure 1A:
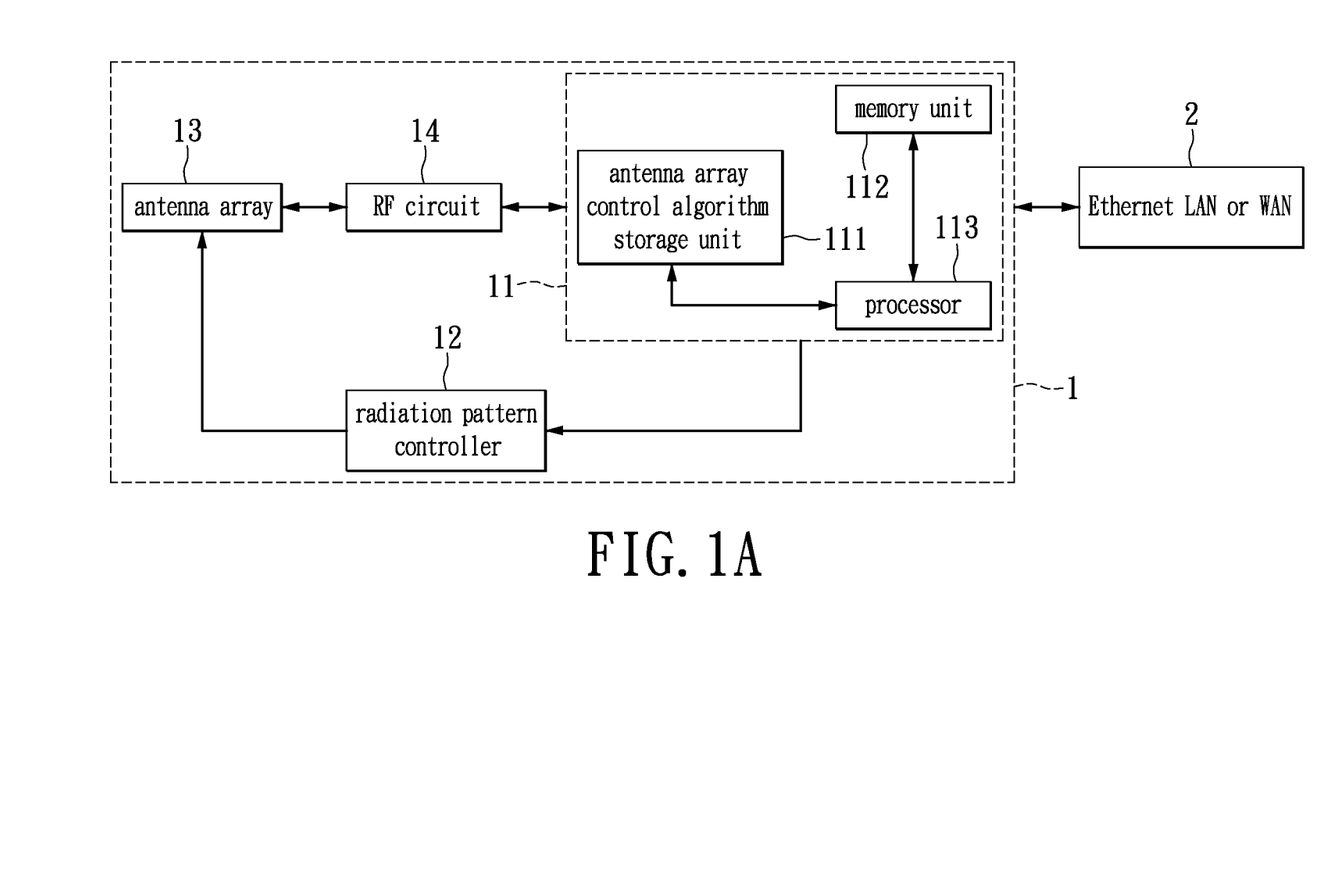
FIG. 1A is a block diagram of an access point according to an exemplary embodiment of the present disclosure.

FIG. 1A is a block diagram of an access point according to an exemplary embodiment of the present disclosure. The access point 1 is linked to the internet services provider (ISP) through the Ethernet local area network or wide area network (Ethernet LAN or WAN) 2, and the client (not shown in FIG. 1) can communicate with the access point 1 to share data or browse the web page. In addition, for each client, the access point 1 can find the best radiation pattern among the plurality of the radiation patterns to communicate with the client. Thus, the access point 1 in fact is a multiple input multiple output system with the beam forming technology. The access point 1 is for example a multiple input multiple output outdoor or indoor access point with the beam forming technology.

The access point 1 comprises an antenna array control method execution unit 11, a radiation pattern controller 12, an antenna array 13, and radio frequency circuit 14. The antenna array control method execution unit 11 is electrically coupled to the radiation pattern controller 12. The radiation pattern controller 12 is electrically coupled to the antenna array 13. The antenna array 13 is electrically coupled to the radio frequency circuit 14. The radio frequency circuit 14 is electrically coupled to the antenna array control method execution unit 11.

The antenna array control method execution unit 11 comprises an antenna array control algorithm storage unit 111, a memory unit 112, and a processor 113. The processor 113 is electrically coupled to the antenna array control algorithm storage unit 111 and the memory unit 112.

The antenna array control algorithm storage unit 111 stores an algorithm associated with the antenna array control method, and can be the non-volatile memory apparatus. The processor 113 performs the antenna array control method according to the algorithm stored in the antenna array control algorithm storage unit 111. The memory unit 112 stores the statistic information of all kinds generated by the execution of the antenna array control method, and can for example be a volatile or non-volatile memory apparatus.

In the exemplary embodiment of FIG. 1A, the antenna array control method is implemented by a firmware or software. However, it is noted that the present disclosure is not limited thereto. In other words, the antenna array control method execution unit 11 can be implemented in software, firmware, or hardware.

The antenna array 13 has a plurality of antennas which provides a plurality of radiation patterns to the radio frequency circuit 14, and thus the radio frequency circuit 14 can use selected one of the radiation patterns provided by the antenna array 13 to transmit or receive the packet. The radiation pattern controller 12 indicates the antenna array 13 to select one of the radiation patterns according to the radiation pattern selection signal generated by antenna array control method execution unit 11.

Figure 1B:
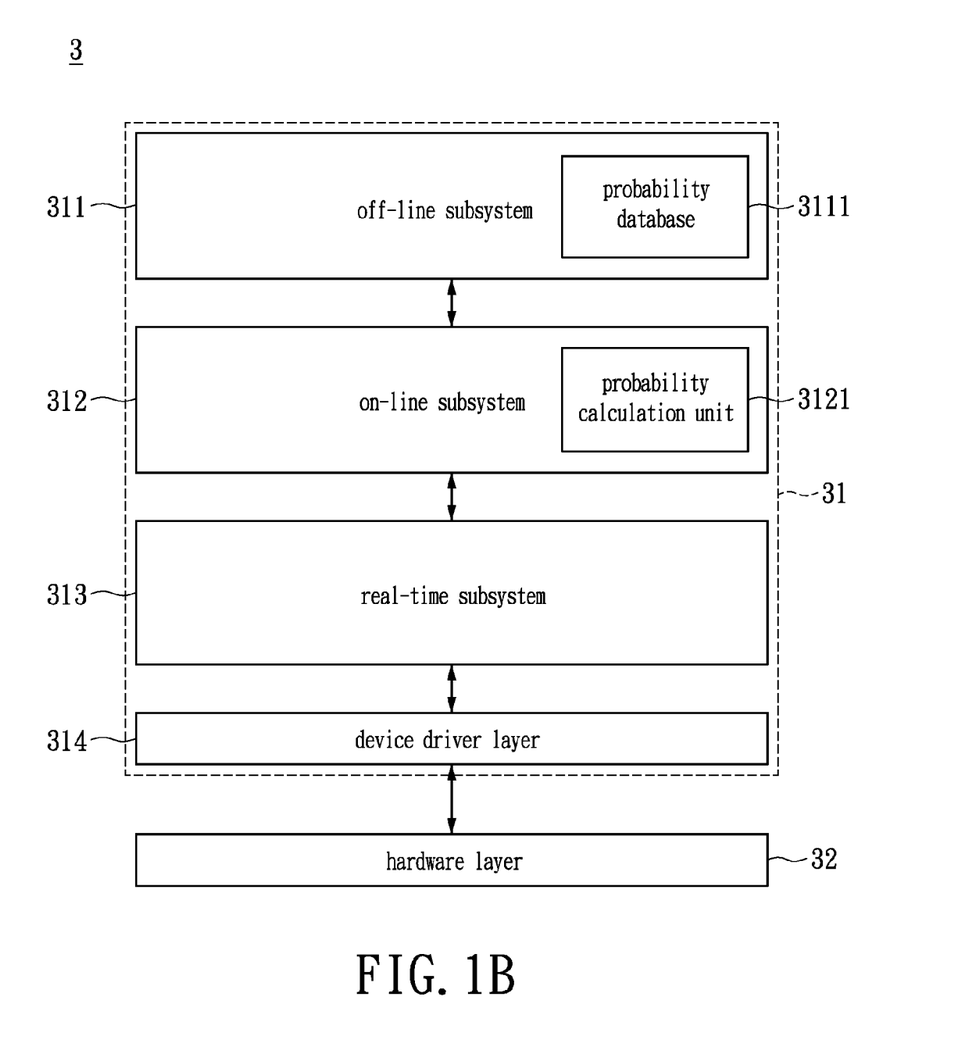
FIG. 1B is a block diagram of a software/hardware architecture of an access point according to an exemplary embodiment of the present disclosure.

Referring to FIG. 1A and FIG. 1B, FIG. 1B is a block diagram of a software/hardware architecture of an access point according to an exemplary embodiment of the present disclosure. The software/hardware architecture 3 of an access point comprises a hardware layer 32 (the elements in FIG. 1A except the antenna array control method execution unit 11) and a software layer 31 (formed by the execution of the antenna array control method performed by the antenna array control method execution unit 11). The software layer can be divided into an off-line subsystem 311, an on-line subsystem 312, a real-time subsystem 313, and a device driver layer 314.

The device driver layer 314 is located on the hardware layer 32 and has a plurality of driver codes for driving the elements corresponding to the hardware layer 32. The real-time subsystem 313 controls the access point 1 to use one of radiation patterns to transmit the probing packet through the device driver layer 314, so as to obtain packet error rates of the radiation patterns and a received signal strength indicator change of the best radiation pattern. The off-line system 311 has a probability database 3111 to store the different kinds of statistic information, and the stored statistic information is served as the prior statistic information of the next probing process.

The on-line subsystem 312 is used to monitor each client, and in particular the moving client. The on-line subsystem 312 has a probability calculation unit 3121. The probability calculation unit 3121 is used to calculate the current probabilities of the radiation patterns to be the best radiation pattern (i.e. the current probability is the probability that the corresponding radiation pattern is selected as the best radiation pattern), and calculates the target probabilities of the radiation patterns next to be the best radiation patterns (i.e. the target probability is the probability that the corresponding radiation pattern will be selected as the best radiation pattern next) according to the current probabilities, transfer probabilities, prior probabilities of the radiation patterns, and the motion variation and trend set of the client. The on-line subsystem 312 sorts the target probabilities to obtain radiation patterns with several biggest target probabilities as the target radiation pattern set, and determines whether the target radiation pattern set equals to the probing radiation pattern. If the target radiation pattern set equals to the probing radiation pattern, the on-line subsystem 312 stores the target radiation pattern set, and sets the stored target radiation pattern set as the probing radiation pattern of the next probing.

[Exemplary Embodiment Probing Packet Transmission Step Performed by Real-Time Subsystem]

Figure 2:
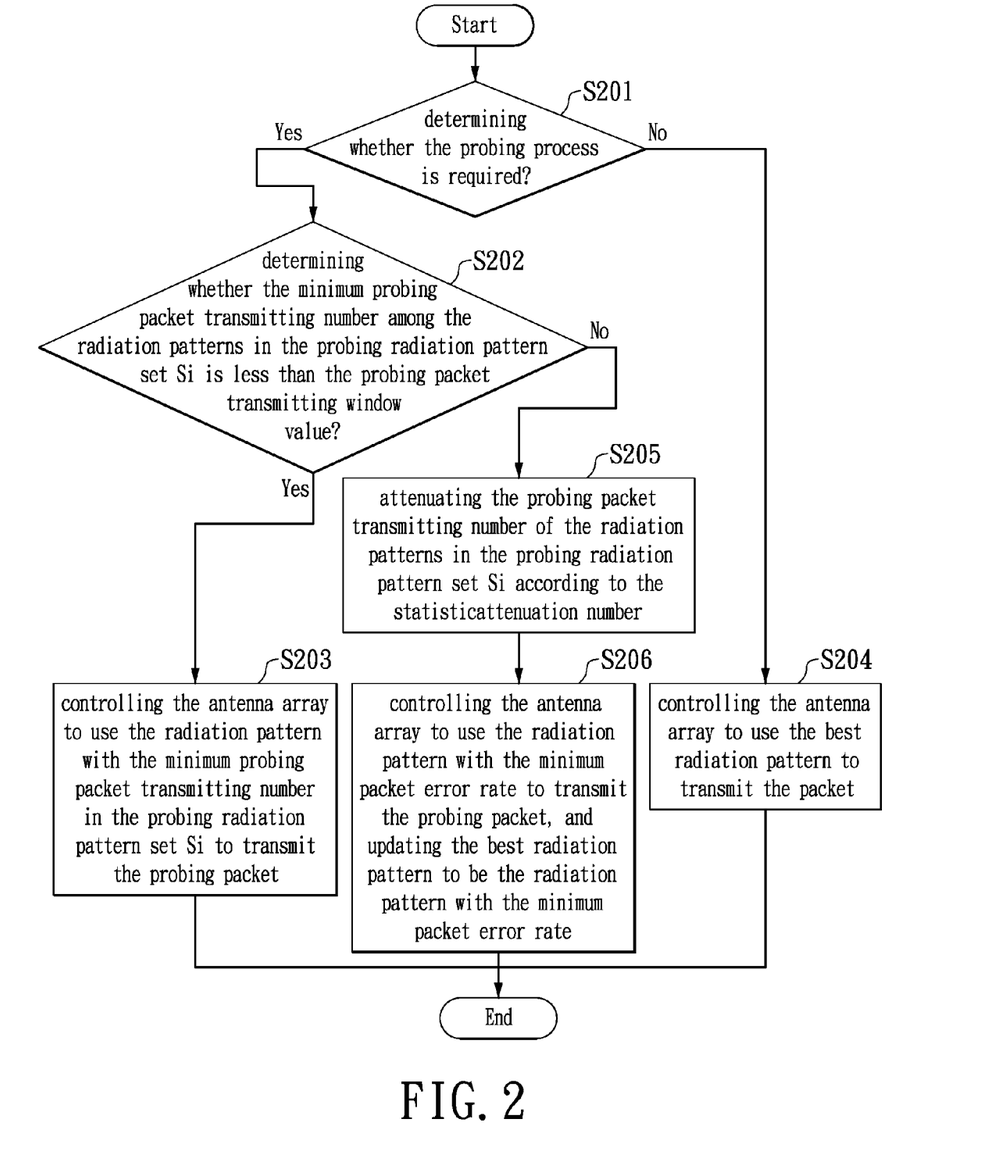
FIG. 2 is a flow chart of a probing packet transmission step performed by a real-time subsystem method according to an exemplary embodiment of the present disclosure.

Referring to FIG. 2, FIG. 2 is a flow chart of a probing packet transmission step performed by a real-time subsystem method according to an exemplary embodiment of the present disclosure. First, at step S201, the real-time subsystem determines whether the probing process is required. If the probing process is required, the step S202 is then executed. If the probing process is not required, the step S204 is then executed. The real-time subsystem selects at least a packet as at least a probing packet to be transmitted every probing period $T_i$, and thus whether a next probing period $T_i$ is reached is used to determine whether the probing process is required, wherein i is the probing number index.

At step S204, since the probing process is not required (i.e. the packet is not served as the probing packet), the real-time subsystem controls the antenna array to use the best radiation pattern to transmit the packet. At step S204, the real-time subsystem further sets the best radiation pattern to be the radiation pattern of the antenna array for receiving the packet.

At step S202, the real-time subsystem determines whether the minimum probing packet transmitting number among the radiation patterns in the probing radiation pattern set $S_i$ (including a portion of all radiation patterns of the antenna array) is less than the probing packet transmitting window value. If the minimum probing packet transmitting number is less than the probing packet transmitting window value, the step S203 is executed. If the minimum probing packet transmitting number is equal to the probing packet transmitting window value (i.e. the probing packet transmitting numbers of the radiation patterns in the probing radiation pattern set $S_i$ are equal to the probing packet transmitting window value), the step S205 is executed.

At step S203, the real-time subsystem determines the antenna array to use the radiation pattern with the minimum probing packet transmitting number in the probing radiation pattern set $S_i$ to transmit the probing packet. In addition, at step S203, the real-time subsystem further sets the radiation pattern of the antenna array 13 for receiving the packet to be the radiation pattern with the minimum probing packet transmitting number in the probing radiation pattern set $S_i$. Through the execution of steps S202 and S203, the real-time subsystem makes the probing packet transmitting number of the radiation patterns in the probing radiation pattern set $S_i$ are the same one, and thus the comparability of the packet error rates is enhanced.

At step S205, the real-time subsystem attenuates the probing packet transmitting number of the radiation patterns in the probing radiation pattern set $S_i$ according to the statistic attenuation number. Next, at step S206, the real-time subsystem determines the antenna array to use the radiation pattern with the minimum packet error rate to transmit the probing packet, and updates the best radiation pattern to be the radiation pattern with the minimum packet error rate. In addition, at step S206, the real-time subsystem further sets the radiation pattern of the antenna array for receiving the packet to be the radiation pattern with the minimum packet error rate.

In the most communication standards, when the client receives a packet, the client then transmits a confirm signal (for example, the acknowledge signal ACK) back to the access point, or equivalently, when the client does not receive the packet for a specific time, the client transmits the non-confirm signal (for example, the non-acknowledge signal NACK) back to the access point. Thus, the real-time subsystem can know whether the probing packet is successfully transmitted to the client, and can further obtain the packet error rates of the radiation patterns in the probing radiation pattern set $S_i$.

It is noted that, the probing period $T_i$ and the probing radiation pattern set $S_i$ is determined by the on-line subsystem. To enhance the accuracy and the execution speed of the antenna array control method, the on-line subsystem can dynamically adjust the probing period $T_i$ and makes the probing radiation pattern set $S_i$ to be as close to the better radiation pattern set S as possible.

[Exemplary Embodiment of Probing Packet Statistic Calculation Step Performed by Real-Time Subsystem]

Figure 3:
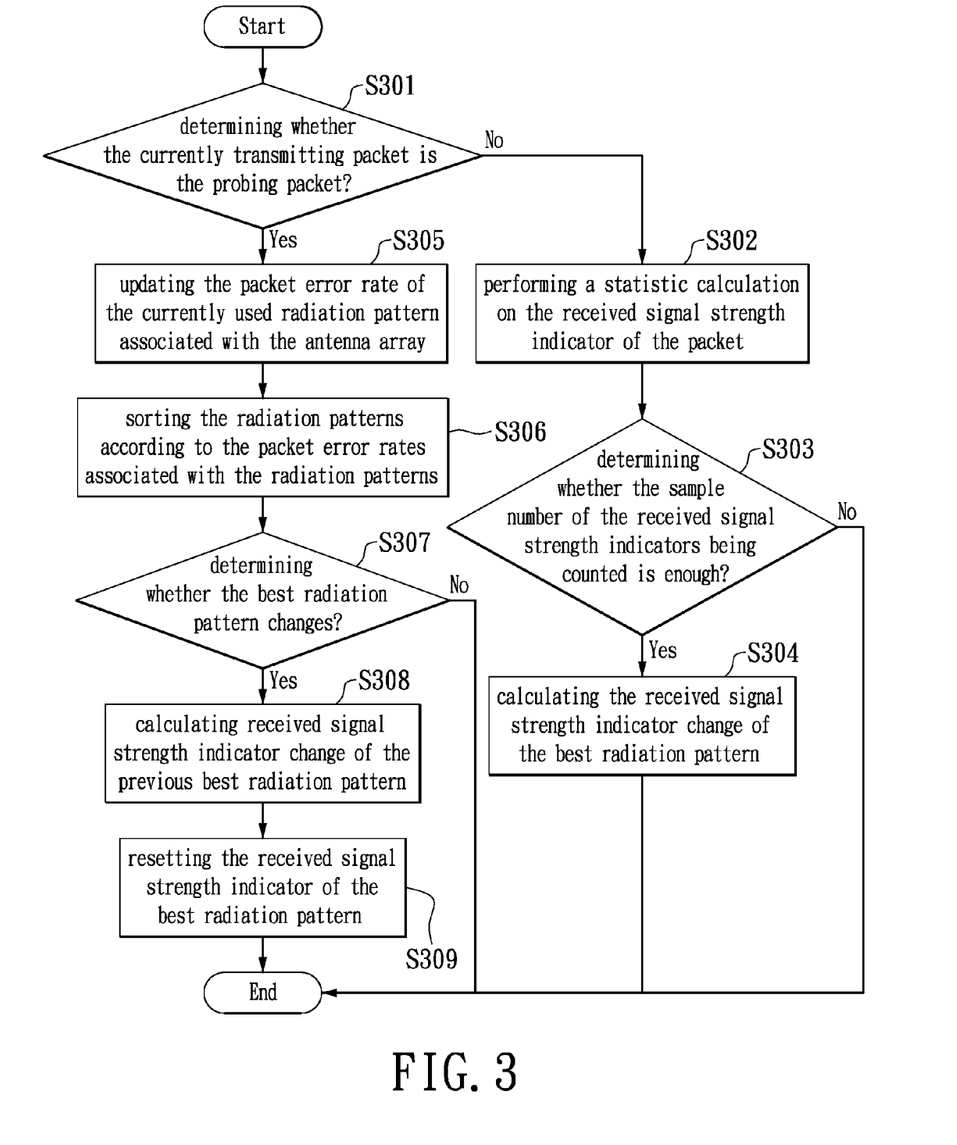
FIG. 3 is a flow chart of a probing packet statistic calculation step performed by a real-time subsystem method according to an exemplary embodiment of the present disclosure.

Please referring to FIG. 3, FIG. 3 is a flow chart of a probing packet statistic calculation step performed by a real-time subsystem method according to an exemplary embodiment of the present disclosure. After the access point transmits the probing packet, the real-time subsystem may further execute the probing packet statistic calculation step, so as to obtain the received signal strength indicator change of the best radiation pattern.

First, at step S301, the real-time subsystem determines whether the currently transmitting packet is the probing packet. If the currently transmitting packet is not the probing packet, the step S302 will be executed. If the currently transmitting packet is the probing packet, the step S305 will be executed.

At step S302, the real-time subsystem performs a statistic calculation on the received signal strength indicator of the packet. Then, at step S303, the real-time subsystem determines whether the sample number of the received signal strength indicators being counted is enough. If the sample number of the received signal strength indicators being counted is enough, the step S304 will be executed. If the sample number of the received signal strength indicators being counted is not enough, the probing packet statistic calculation step will be ended. It is noted that, at step S303, whether the statistic period used to perform the statistic calculation on the received signal strength indicator is used to determine whether the sample number of the received signal strength indicators being counted is enough.

At step S304, the real-time subsystem calculates the received signal strength indicator change of the best radiation pattern, and determines the statistic attenuation value, the probing period $T_i$ and the probing radiation pattern set correspondingly, wherein the received signal strength indicator change of the best radiation pattern is obtained according to the received signal strength indicators of the packet transmitted by using the best radiation pattern.

At step S305, the real-time subsystem updates the packet error rate of the currently used radiation pattern associated with the antenna array. At step S306, the real-time subsystem sorts the radiation patterns according to the packet error rates associated with the radiation patterns.

Next, at step S307, real-time subsystem determines whether the best radiation pattern changes, i.e. determines whether the radiation pattern with the minimum packet error rate is still the previous best radiation pattern. If the best radiation pattern changes, the step S308 will be executed. By contrast, if the best radiation pattern doesn't change, the probing packet statistic calculation step will be ended.

At step S308, real-time subsystem calculates received signal strength indicator change of the previous best radiation pattern, and determines the statistic attenuation value, the probing period $T_i$, the probing radiation pattern set $S_i$ correspondingly, wherein the received signal strength indicator change of the previous best radiation pattern is obtained according to the received signal strength indicators of the packets transmitted by the previous best radiation pattern. Next, at step S309, real-time subsystem resets the received signal strength indicator of the best radiation pattern, so as to recalculate the received signal strength indicator change of the best radiation pattern.

The formula of the received signal strength change of the best radiation pattern is for example can be expressed as CR=PT0/2+(CR1+CR2)/4. The variable CR is present of the received signal strength change of the best radiation pattern, and the variables CR1 and CR2 are respectively present of the received signal received strength indicators of the previous two best radiation patterns. The variable PT0 is expressed as PT0=num(-r≤RSSI$_k$-RA1≤r)/SampleNum, wherein the variable SampleNum is present of the sample number of the received signal strength indicator, the variable r is a user defined positive integer, such as 1, the variable RA1 is present of the average received signal strength indicator in the previous statistic period, the variable RSSI$_k$ is the received signal strength indicator in the previous statistic period, and the function num(-r≤RSSI$_k$-RA1≤r) means the number which the difference between the received signal strength indicator and the average received signal strength indicator in the previous statistic period is not less than -r and not larger than r. In short, the variable PT0 is present of the ratio of the number which the difference between the received signal strength indicator and the average received signal strength indicator in the previous statistic period is not less than -r and not larger than r, over the sample number of the received signal strength indicators.

However, it is noted that, the formula of the received signal strength indicator change may be modified to meet the different requirements. The formula of the received signal strength indicator change is not used to limit the present disclosure.

[Exemplary Embodiment of Better Radiation Pattern Set Obtaining Step Performed by On-Line Subsystem]

Figure 4A:
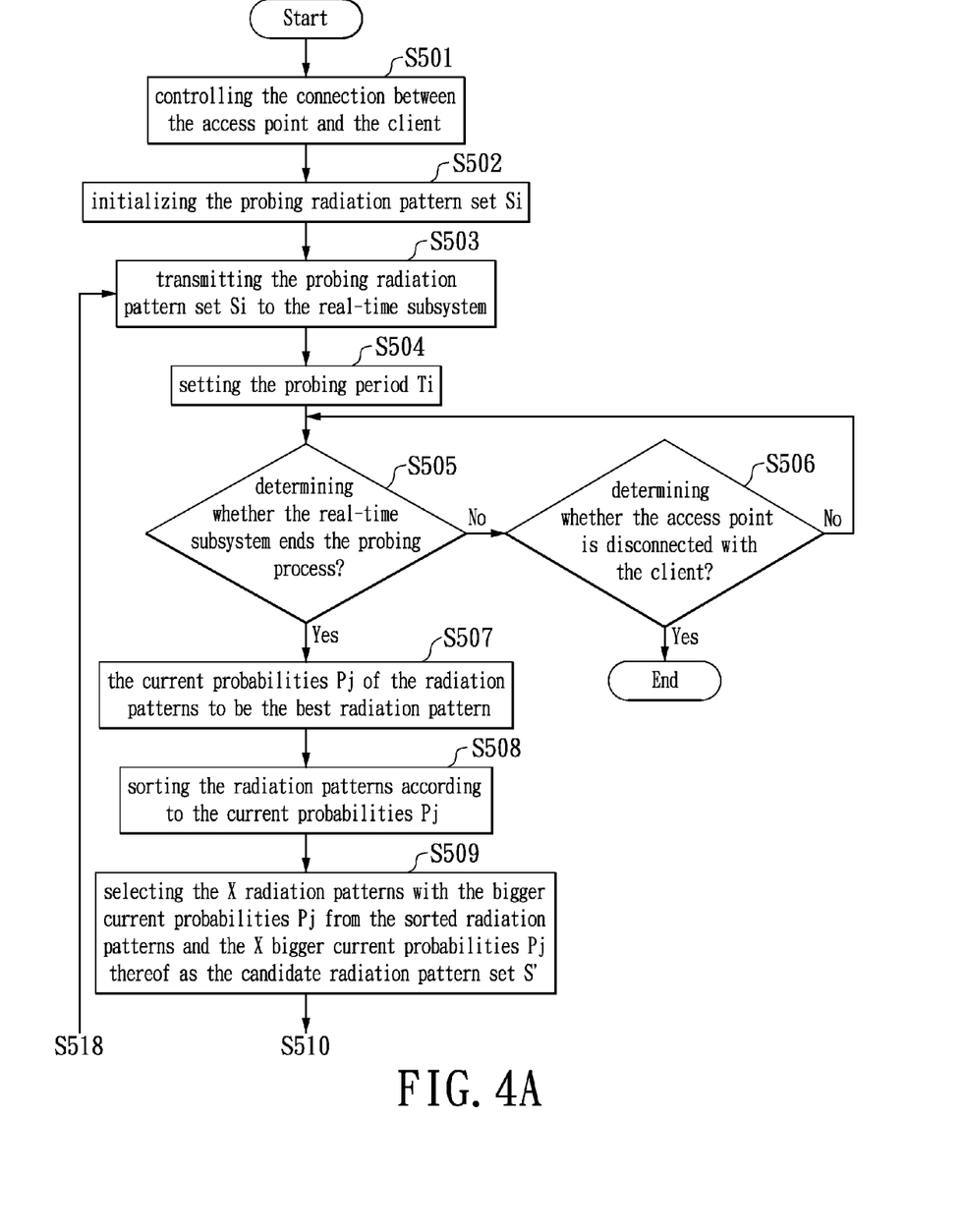
FIG. 4A and FIG. 4B are respectively an upper and lower parts of a flow chart of a better radiation pattern set obtaining step performed by a on-line subsystem method according to an exemplary embodiment of the present disclosure.
Figure 4B:
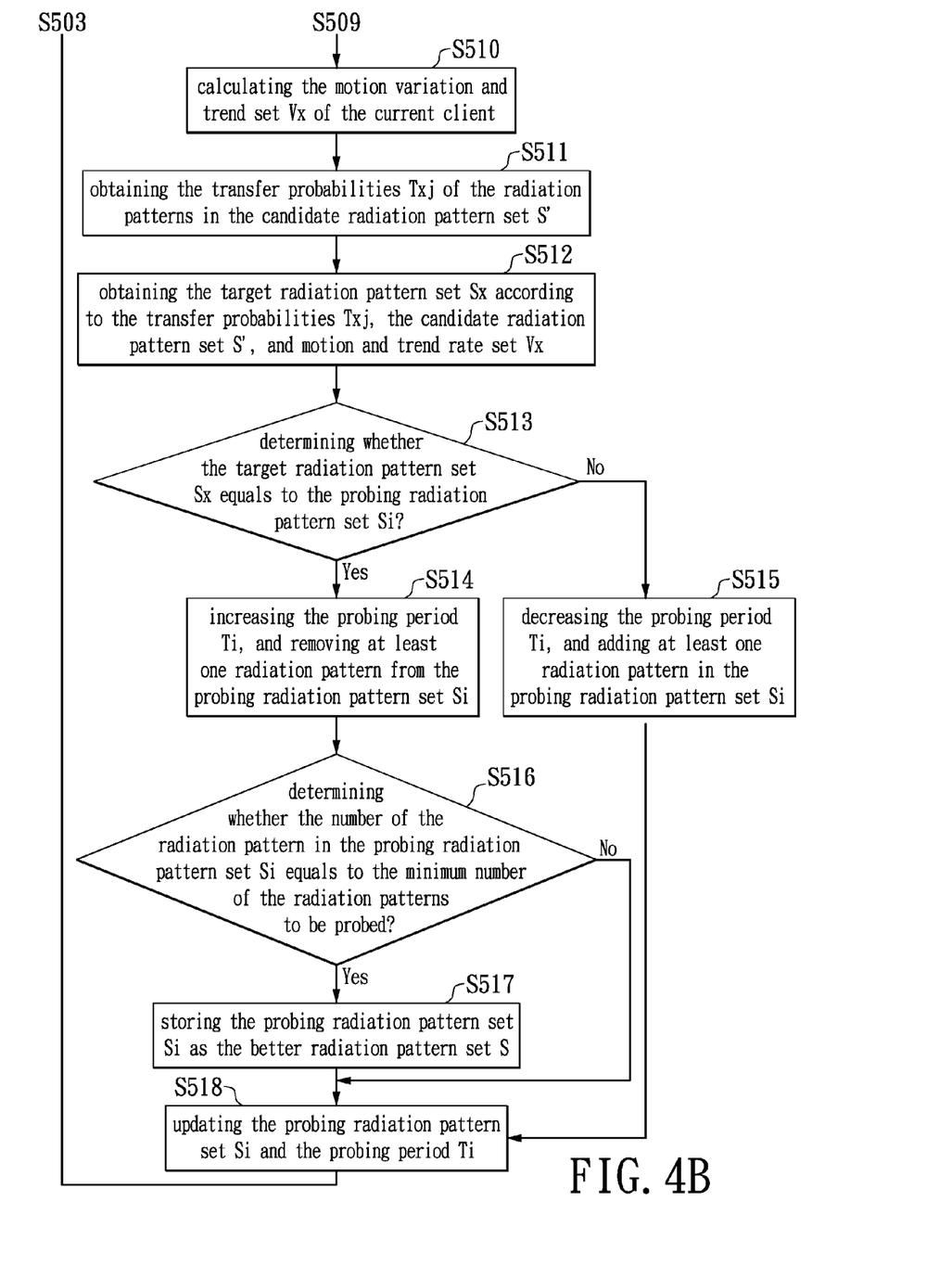

Referring to FIG. 4A and FIG. 4B, FIG. 4A and FIG. 4B are respectively an upper and lower parts of a flow chart of a better radiation pattern set obtaining step performed by a on-line subsystem method according to an exemplary embodiment of the present disclosure. Firstly, at step S501, the on-line subsystem controls the connection between the access point and the client. Then, at step S502, the on-line subsystem initializes the probing radiation pattern set S$_i$ according to the prior probabilities of the radiation patterns to be the best radiation pattern. For the moving client, in order to find the corresponding best radiation pattern fast and accurately, the number of the radiation patterns in the probing radiation pattern set S$_i$ should be as small as possible, and the prior probabilities of the radiation patterns to be the best radiation pattern in the probing radiation pattern set S$_i$ should be as high as possible. For example, the on-line subsystem selects the radiation patterns with several bigger prior probabilities to initialize the probing radiation pattern set S$_i$. In addition, the on-line subsystem requests the off-line subsystem to obtain the prior probabilities of the radiation patterns, and the prior probabilities of the radiation patterns are stored in the probability database of the off-line subsystem.

Next, at step S503, the on-line subsystem transmits the probing radiation pattern set S$_i$ to the real-time subsystem, and the real-time subsystem uses one of the radiation patterns in the probing radiation pattern set S$_i$ to transmit the probing packet and process the probing packet statistic calculation step (comprising the statistic calculation on the packet error rates of the radiation patterns, and the received signal strength indicators and the received signal strength indicator change of the best radiation pattern).

Then, at step S504, the on-line subsystem sets the probing period T$_i$. Next, at step S505, the on-line subsystem determines whether the real-time subsystem ends the probing process, i.e. whether the probing packet in the probing period T$_i$ is transmitted and the probing packet statistic calculation step is processed. If the real-time subsystem ends the probing process, step S507 is executed. If the real-time subsystem does not end the probing process, step S506 is executed. At step S506, the on-line subsystem determines whether the access point is disconnected with the client. If the access point is disconnected with the client, the on-line subsystem ends the better radiation pattern set obtaining step. If the access point is not disconnected with the client, the on-line subsystem executes step S505 to wait the real-time subsystem ends the probing process.

Next, at step S507, the on-line subsystem obtains the current probabilities P$_j$ of the radiation patterns according to the packet error rates of the radiation patterns which are statistically calculated by the real-time subsystem, wherein j is the radiation pattern index, i.e. P$_j$ is the current probability for that the j$^{th}$ radiation pattern is selected as the best radiation pattern. The formula of the current probability P$_j$ is expressed as $$P_j = (1 - PER_j)/\sum_{k=0}^{N-1}(1 - PER_k),$$

wherein PER$_j$ is the packet error rate of the j$^{th}$ radiation pattern.

At step S508, the on-line subsystem sorts the radiation patterns according to the current probabilities P$_j$. Then, at step S509, the on-line subsystem selects the X radiation patterns with the bigger current probabilities P$_j$ from the sorted radiation patterns and the X bigger current probabilities P$_j$ thereof as the candidate radiation pattern set S', wherein a summation of the X bigger current probabilities P$_j$ is larger than a threshold value, such as 80%.

Then, at step S510, the on-line subsystem calculates the motion variation and trend set V$_x$ of the current client, wherein the motion variation and trend set V$_x$ is the set comprising the motion variations and trends of the radiation patterns. The motion variation and trend of the radiation pattern comprises the received signal strength indicator change and the current probability change of radiation pattern to be the best radiation pattern. The current probability change of radiation pattern can be expressed as $$PV_j = \Delta PER_j / \sum_{k=0}^{N-1} \Delta PER_j,$$

wherein ΔPER$_j$ is the packet error rate difference of the corresponding radiation pattern. When PER'$_j$ is larger than or equal to PER$_j$, the formula of the packet error rate ΔPER$_j$ can be expressed as ΔPER$_j$=PER'$_j$-PER$_j$, wherein PER'$_j$ is the packet error rate of the j$^{th}$ radiation pattern when the probing period starts, and PER$_j$ is the current packet error rate of the j$^{th}$ radiation pattern. When PER'$_j$ is less than PER$_j$, ΔPER$_j$ is zero.

Next, at step S511, the on-line subsystem obtains the transfer probabilities T$_{xj}$ of the radiation patterns in the candidate radiation pattern set S' from the probability data base of the off-line subsystem. The transfer probabilities is present of T$_{xj}$ which means the probability that the best radiation pattern changes to be the j$^{th}$ radiation pattern from the x$^{th}$ radiation pattern, wherein x is the radiation pattern index of the radiation pattern in the candidate radiation pattern set S'.

Then, at step S512, the on-line subsystem obtains the target radiation pattern set S$_x$ according to the transfer probabilities T$_{xj}$, the candidate radiation pattern set S', and motion variation and trend set V$_x$. To put it concretely, the on-line subsystem calculates the target probabilities a$_i$ of the radiation patterns next to be the best radiation patterns, and selects the radiation patterns with the several bigger target probabilities a$_i$ as the target radiation pattern set S$_x$, wherein the number of the selected radiation patterns is equal to the number of the radiation patterns in the probing radiation pattern set $S_i$. In addition, the formula of the target probability a, can be expressed as $a_i = PV_i \times \max_{x \in S'}(T_{xi} \times CR_x \times P_x)$, wherein $\max_{x \in S'}(T_{xi} \times CR_x \times P_x)$ is the maximum value of $T_{xi} \times CR_x \times P_x$ in the candidate radiation pattern set S'.

Next, at step S513, the on-line subsystem determines whether the target radiation pattern set $S_x$ equals to the probing radiation pattern set $S_i$. If the target radiation pattern set $S_x$ equals to the probing radiation pattern set $S_i$, step S514 is executed. If the target radiation pattern set $S_x$ does not equal to the probing radiation pattern set $S_i$, step S515 is executed.

When the radiation pattern set $S_x$ equals to the probing radiation pattern set $S_i$, the on-line subsystem recognizes the probing radiation pattern set $S_i$ has a radiation pattern to be selected as the best radiation pattern, thus at step S514, the probing period $T_i$ is increased, and at least one radiation pattern in the probing radiation pattern set $S_i$ is removed therefrom, such that the number of the radiation patterns in the probing radiation pattern set $S_i$ is decreased as small as possible, and the execution time of the antenna array control method is decreased.

By contrast, when the target radiation pattern set $S_x$ does not equal to the probing radiation pattern set $S_i$, the on-line subsystem recognizes the probing radiation pattern set $S_i$ does not has the radiation pattern to be the best radiation pattern, thus at step S515, the probing period $T_i$ is decreased, and at least one radiation pattern is added in the probing radiation pattern set $S_i$, such that the number of the radiation pattern in the probing radiation pattern set $S_i$ is increased, and the antenna array control method has the higher probability for finding the best radiation pattern in the probing radiation pattern set $S_i$. Next, at step S518, the on-line subsystem updates the probing radiation pattern set $S_i$ and the probing period $T_i$, and the antenna array control method goes back to process step S503.

At step S516, the on-line subsystem determines whether the number of the radiation pattern in the probing radiation pattern set $S_i$ equals to the minimum number of the radiation patterns to be probed. If the radiation pattern in the probing radiation pattern set $S_i$ equals to the minimum number of the radiation patterns to be probed, step S517 is executed. If the radiation pattern in the probing radiation pattern set $S_i$ does not equal to the minimum number of the radiation patterns to be probed, step S518 is executed.

At step S517, the on-line subsystem stores the probing radiation pattern set $S_i$ as the better radiation pattern set S. At step S518, the on-line subsystem updates the probing radiation pattern set $S_i$ and the probing period $T_i$, and then the antenna array control method goes back to process step S503.

To sum up, through the iteratively executes steps in FIG. 4A and FIG. 4B, the probing radiation pattern set $S_i$ probed by the on-line subsystem will be close to the better radiation pattern set S.

[Exemplary Embodiment of Command Execution Step Performed by Off-Line Subsystem]

Figure 5:
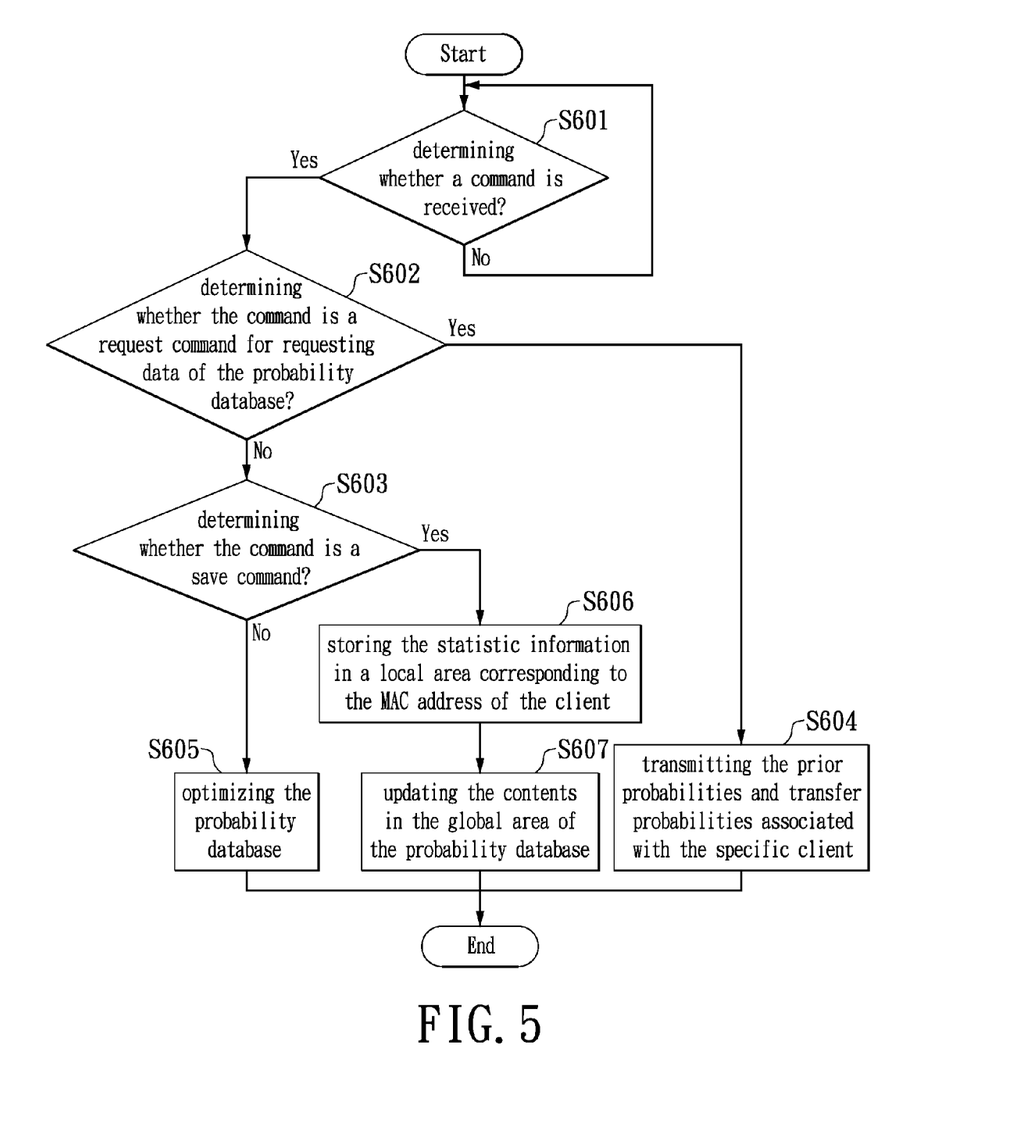
FIG. 5 is a flow chart of a command execution step performed by an off-line subsystem according to an exemplary embodiment of the present disclosure.

Referring to FIG. 5 is a flow chart of a command execution step performed by an off-line subsystem according to an exemplary embodiment of the present disclosure. Firstly, at step S601, the off-line subsystem determines whether a command is received. If the command is received, step S602 is executed. If the command is not received, step S601 is still executed to wait until the command is received. At step S602, the off-line subsystem determines whether the command is a request command for requesting data of the probability database. If the command is the request command, step S604 is executed. If the command is not the request command, step S603 is executed. At step S604, the off-line subsystem transmits the prior probabilities and transfer probabilities associated with the specific client to the on-line subsystem.

At step S603, the off-line subsystem determines whether the command is a save command. If the command is the save command, step S606 is executed. If the command is not the save command, step S605 is executed. At step S605, the off-line subsystem optimizes the probability database. Since the statistic information of different kinds associated with the clients has the difference, but still has the identical portion, the probability database can optimized to reduce the storage space of the probability data base.

At step S606, the off-line subsystem stores the statistic information in a local area corresponding to the medium access control (MAC) address of the client. At step S607, since statistic information of different kinds associated with the clients has the identical portion, the off-line subsystem updates the contents in the global area of the probability database after the off-line subsystem stores the statistic information in a local area corresponding to the MAC address of the client, so as to achieve the optimization.

[Possible Results of Exemplary Embodiment]

To sum up, the antenna array control method and access point of the exemplary embodiments can fast and accurately find the best radiation pattern to communicate with the client. Furthermore, compared to the conventional access point, the access point using the above antenna array control method has the increased wireless coverage, the enhanced data throughput, and the improved data transmission rate. In addition, regarding the moving client, the antenna array control method can make the data transmission rate between the client and the access point stable.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An antenna array control method, comprising:
   selecting at least a packet as at least a probing packet every probing period;
   using one radiation pattern in a probing radiation pattern set to transmit the probing packet;
   selecting the radiation pattern with the minimum packet error rate among all radiation patterns as a best radiation pattern;
   when the probing period expires, obtaining a candidate radiation pattern set according to current probabilities of the radiation patterns to be the best radiation pattern;
   obtaining transfer probabilities of the radiation patterns in the candidate radiation pattern set;
   obtaining a target radiation pattern set according to the transfer probabilities, a motion variation and trend set, and the candidate radiation pattern set; and
   adjusting the probing period and the probing radiation pattern set according to whether the target radiation pattern set equals to the probing radiation pattern set;
   wherein when the target radiation pattern set is equal to the probing radiation pattern set, the probing period is increased, and at least one radiation pattern in the probing radiation pattern set is removed therefrom;
   wherein when the target radiation pattern set is not equal to the probing radiation pattern set, the probing period is decreased, and at least one radiation pattern is added in the probing radiation pattern set.

2. The antenna array control method according to claim 1, further comprising:
    calculating the packet error rates of the radiation patterns to be probed; and
    calculating the current probabilities of the radiation patterns to be the best radiation pattern according to the packet error rates.

3. The antenna array control method according to claim 1, further comprising:
    initializing the probing radiation pattern set according to prior probabilities of the radiation patterns to be the best radiation pattern; and setting the probing period.

4. The antenna array control method according to claim 1, wherein the radiation patterns are sorted according to the current probabilities of the radiation patterns, the radiation patterns with the several bigger current probabilities and the current probabilities thereof are selected to obtain the candidate radiation pattern set.

5. The antenna array control method according to claim 4, wherein a summation of the current probabilities of the radiation patterns in the candidate radiation pattern set is larger than a threshold value.

6. The antenna array control method according to claim 1, further comprising:
    calculating the motion variation and trend set of a current client,
    wherein the motion variation and trend set comprises received signal strength indicator changes and current probability changes of the radiation patterns to be the best radiation pattern.

7. The antenna array control method according to claim 1, further comprising:
    if the target radiation pattern set is equal to the probing radiation pattern set, and the number of the radiation patterns in the probing radiation pattern set is equal to a minimum number of the radiation patterns to be probed, the probing radiation pattern set is stored as a better radiation pattern set.

8. An access point, comprising:
    an antenna array, having a plurality of radiation patterns;
    a radiation pattern controller, electrically coupled to the antenna array, used to control the antenna array to use one of the radiation patterns according to a radiation pattern selection signal;
    a radio frequency circuit electrically coupled to the antenna array;
    an antenna array control method execution unit, electrically coupled to the radio frequency circuit and the radiation pattern controller, used to select at least a packet as at least a probing packet every probing period, control the access point to use one radiation pattern of the radiation patterns to be probed in the antenna array to transmit the probing packet through generating the radiation pattern selection signal, calculate the packet error rates of the radiation patterns to be probed, and control the access point to select the radiation pattern with the minimum packet error rate among all radiation patterns as a best radiation pattern through generating the radiation pattern selection signal;
    wherein when the probing period expires, the antenna array control method execution unit obtains a candidate radiation pattern set according to current probabilities of the radiation patterns to be the best radiation pattern, obtains the transfer probabilities of the radiation patterns in the candidate radiation pattern set, obtains a target radiation pattern set according to the transfer probabilities, a motion variation and trend set, and the candidate radiation pattern set, and adjusts the probing period and the probing radiation pattern set according to whether the target radiation pattern set equals to the probing radiation pattern set;
    wherein when the target radiation pattern set is not equal to the probing radiation pattern set, the probing period is decreased, and at least one radiation pattern is added in the probing radiation pattern set by the antenna array control method execution unit;
    wherein if the target radiation pattern set is equal to the probing radiation pattern set, and the number of the radiation patterns in the probing radiation pattern set is equal to a minimum number of the radiation patterns to be probed, the antenna array control method execution unit stores the probing radiation pattern set as a better radiation pattern set.

9. The access point according to claim 8, wherein the antenna array control method execution unit calculates the current probabilities of the radiation patterns to be the best radiation pattern according to the packet error rates.

10. The access point according to claim 8, wherein the antenna array control method execution unit further initializes the probing radiation pattern set according to prior probabilities of the radiation patterns to be the best radiation pattern, and sets the probing period.

11. The access point according to claim 8, wherein the antenna array control method execution unit sorts the radiation patterns according to the current probabilities of the radiation patterns, and selects the radiation patterns with the several bigger current probabilities and the current probabilities thereof to obtain the candidate radiation pattern set.

12. The access point according to claim 11, wherein a summation of the current probabilities of the radiation patterns in the candidate radiation pattern set is larger than a threshold value.

13. The access point according to claim 8, wherein the antenna array control method execution unit calculates the motion variation and trend set of a current client, wherein the motion variation and trend set comprises received signal strength indicator changes and current probability changes of the radiation patterns to be the best radiation pattern.

14. The access point according to claim 8, wherein when the target radiation pattern set equals to the probing radiation pattern set, the probing period is increased, and at least one radiation pattern in the probing radiation pattern set is removed therefrom by the antenna array control method execution unit.

* * * * *